United States Patent
Kwon et al.

(10) Patent No.: US 8,320,582 B2
(45) Date of Patent: Nov. 27, 2012

(54) INTERFERENCE SIGNAL REMOVING APPARATUS AND RF RECEIVER USING THE SAME

(75) Inventors: Ick-jin Kwon, Gyeonggi-do (KR); Jae-sup Lee, Gyeonggi-do (KR); Han-woong Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1227 days.

(21) Appl. No.: 12/122,790

(22) Filed: May 19, 2008

(65) Prior Publication Data
US 2009/0175465 A1  Jul. 9, 2009

(30) Foreign Application Priority Data

Jan. 8, 2008  (KR) .................. 10-2008-0002177

(51) Int. Cl.
*H04B 15/00*  (2006.01)

(52) U.S. Cl. ....... 381/93; 381/94.1; 381/94.3; 381/94.5; 381/98

(58) Field of Classification Search .............. 381/93, 381/94.1, 94.3, 94.5, 98
See application file for complete search history.

(56) References Cited

U.S. PATENT DOCUMENTS

| | | |
|---|---|---|
| 2003/0181188 A1* | 9/2003 | Darabi ...................... 455/313 |
| 2008/0056417 A1* | 3/2008 | Chen et al. ................ 375/350 |
| 2010/0109771 A1* | 5/2010 | Baik et al. ................ 330/149 |

\* cited by examiner

*Primary Examiner* — Wai Sing Louie
(74) *Attorney, Agent, or Firm* — NSIP Law

(57) ABSTRACT

An interference signal removing apparatus of a radio frequency (RF) receiver includes a low noise amplification unit which performs low noise amplification, a feedback processing unit which removes a necessary signal in a desired band from a signal output from the low noise amplification unit, and performs feedback of the signal from which the necessary signal is removed, and a signal processing unit which transmits a processed RF signal by synthesizing an input RF signal and the feedback signal to the noise amplification unit.

9 Claims, 4 Drawing Sheets

INTERFERENCE SIGNAL REMOVING APPARATUS AND RF RECEIVER USING THE SAME

CROSS-REFERENCE TO RELATED APPLICATIONS

This application claims the benefit under 35 U.S.C. §119(a) of a Korean Patent Application No. 10-2008-0002177, filed on Jan. 8, 2008, in the Korean Intellectual Property Office, the disclosure of which is incorporated herein by reference in its entirety.

TECHNICAL FIELD

The following description relates to an interference signal removing apparatus and a radio frequency (RF) receiver using the same.

BACKGROUND

In an RF receiver, an RF filter is generally used between an antenna and a low noise amplifier (LNA). The RF filter performs a function of a band pass filter (BPF) which passes signals of desired bands among a diverse range of channels, and filters signals of undesired bands. Such an RF filter may be difficult to integrate into a single chip. Where the RF filter is implemented on a chip, the performance of the RF filter degrades, and accordingly, the RF filter is typically implemented using an external element such as a surface acoustic wave (SAW) filter.

FIG. 1 illustrates an apparatus for removing interference signals in a conventional RF receiver. As illustrated in FIG. 1, the conventional interference signal removing apparatus includes an antenna 10, an RF SAW filter 20, and a LNA 30. Where RF signals are transmitted to the antenna 10 through a channel, the RF SAW filter 20 performs band pass filtering and the on-chip LNA 30 of the RF receiver suppresses noise and amplifies desired signals.

The RF SAW filter 20 is an external element and it is not integrated into a single chip. It is also necessarily provided with an external SAW filter for each desired band in order to selectively receive the desired band among a multi-band, so the cost and size of the SAW filter may increase.

SUMMARY

In one general aspect, there is provided an apparatus for removing interference signals by performing a feedback processing in an RF receiver.

In another general aspect, an interference signal removing apparatus includes a low noise amplification unit which performs low noise amplification of an input RF signal, a feedback processing unit which removes a necessary signal in a desired band from a signal output from the low noise amplification unit and performs feedback of the signal from which the necessary signal has been removed, and a signal processing unit which transmits a processed RF signal by synthesizing the input RF signal and the feedback signal to the low noise amplification unit.

An interference signal may be removed from the processed RF signal by synthesizing the input RF signal and the feedback signal.

The feedback processing unit may include a band reject filter.

The feedback processing unit may further include an amplifier which amplifies the signal processed by the low noise amplification unit, and transmits the amplified signal to the band reject filter.

The feedback processing unit may include an in-phase signal processing unit which removes a necessary signal from an in-phase signal of the low-noise-amplified signal, a quadrature signal processing unit which removes a necessary signal from a quadrature signal of the low-noise-amplified signal, and a signal mixing unit which mixes the signals processed by the in-phase signal processing unit and the quadrature signal processing unit, and transmits the mixed signal to the signal processing unit.

The in-phase signal processing unit and the quadrature signal processing unit each may include a down-mixing unit which lowers a frequency of the low-noise-amplified signal to a baseband, a high-pass filter which filters out the necessary signal from the signal adjusted to the baseband, and an up-mixing unit which raises a frequency of the high-pass-filtered signal to an RF band.

A local frequency used in the down-mixing unit may be the same as that used in the up-mixing unit.

The apparatus may further include a second low noise amplification unit which is connected to an input port of the interference signal removing apparatus.

In still another general aspect, a radio frequency (RF) receiver includes a low noise amplification unit which performs low noise amplification of an input RF signal, a feedback processing unit which removes a necessary signal in a desired band from a signal output from the low noise amplification unit, and performs feedback of the signal from which the necessary signal has been removed, and a signal processing unit which transmits a processed RF signal by synthesizing the input RF signal and the feedback signal to the noise amplification unit, wherein the low noise amplification unit, the feedback processing unit, and the signal processing unit are integrated into a single chip.

An interference signal may be removed from the processed RF signal by synthesizing the input RF signal and the feedback signal.

The radio frequency (RF) receiver may further include an antenna to receive an RF signal of a multi-band.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions are omitted to increase clarity and conciseness.

Figure 1:
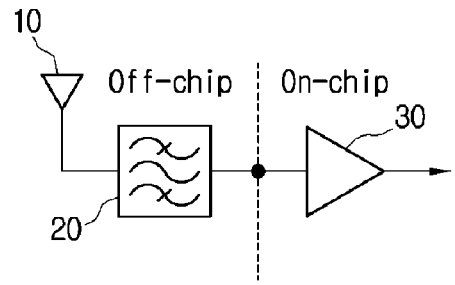
FIG. 1 is a diagram illustrating an exemplary interference signal removing apparatus of a conventional RF receiver.
Figure 2:
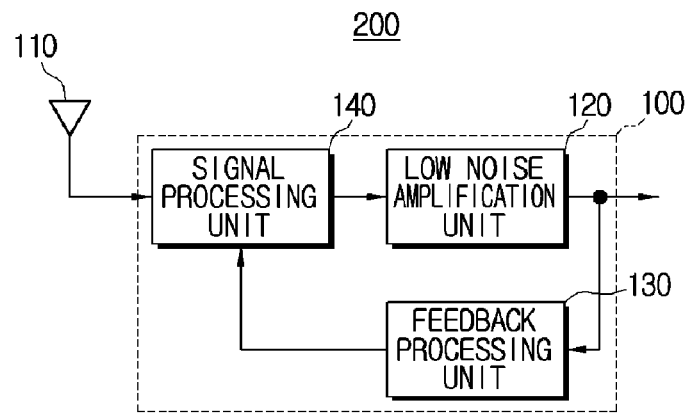
FIG. 2 is a block diagram illustrating an exemplary interference signal removing apparatus of a RF receiver according to an exemplary embodiment

FIG. 2 illustrates an exemplary interference signal removing apparatus 100 of an RF receiver 200 according to an exemplary embodiment. As illustrated in FIG. 2, the RF receiver 200 includes an antenna 110 and the interference signal removing apparatus 100. The interference signal removing apparatus 100 includes a low noise amplification unit 120, a feedback processing unit 130, and a signal processing unit 140. The low noise amplification unit 120 receives an RF signal through the antenna 110 and performs low noise amplification. The feedback processing unit 130 removes a necessary signal of a desired band from a signal output from the low noise amplification unit 120, and performs feedback. The signal processing unit 140 provides the low noise amplification unit 120 with a processed RF signal from which an interference signal is removed by synthesizing the RF signal input and the feedback signal.

Figure 3:
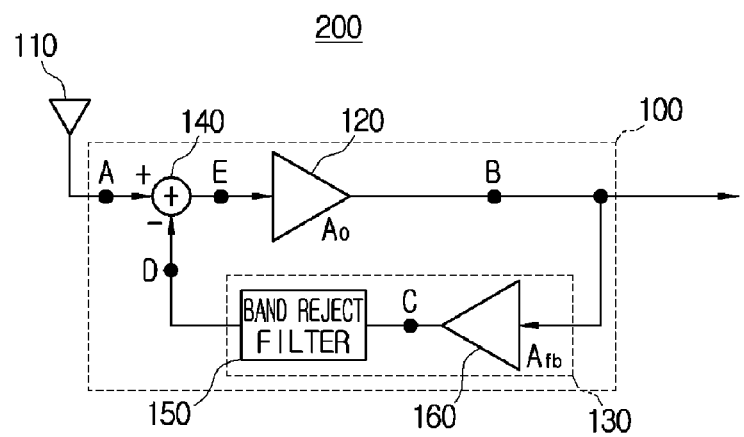
FIG. 3 is a diagram illustrating an exemplary interference signal removing apparatus of FIG. 2 in more detail.

FIG. 3 illustrates the interference signal removing apparatus 100 of the RF receiver 200 of FIG. 2 in more detail, and FIGS. 4A to 4E illustrate waveforms of a signal at each node of the interference signal removing apparatus. Hereinafter, the operation of the interference signal removing apparatus 100 of the RF receiver 200 is described with reference to FIG. 3 and FIGS. 4A to 4E.

Figure 4A:
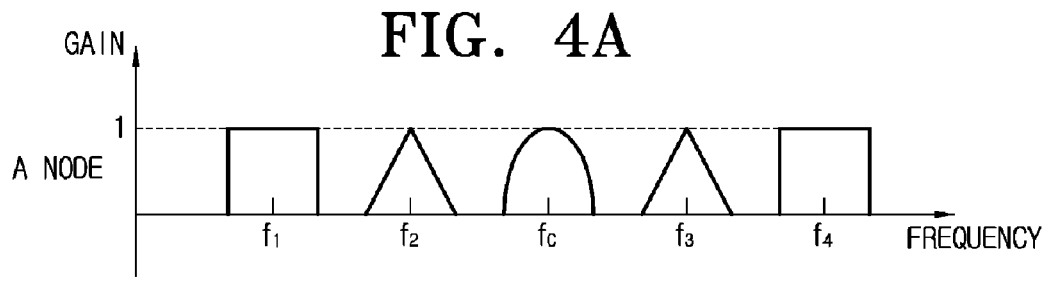
FIGS. 4A to 4E are diagrams illustrating exemplary waveforms of a signal at each node of an interference signal removing apparatus according to an exemplary embodiment.
Figure 4B:
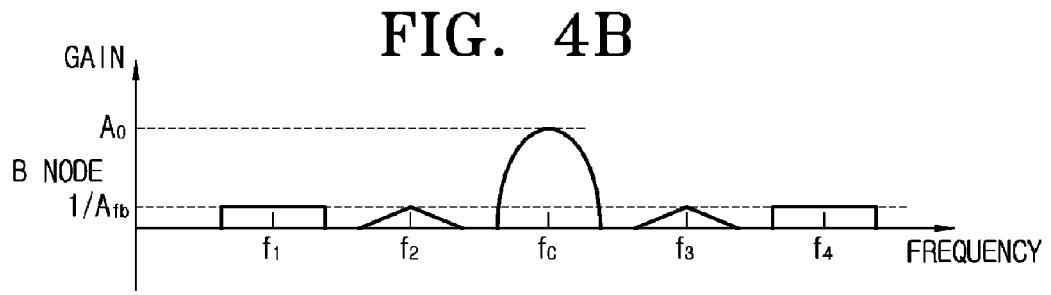
Figure 4C:
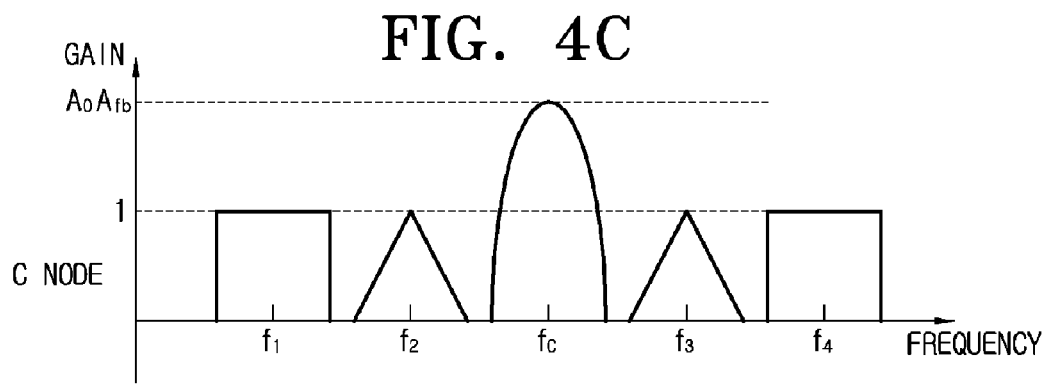

An RF signal of a multi-band is input through the antenna 110. As shown in FIG. 4A, at node A, the RF signal shows a waveform of multi-band signals having different center frequencies $f_1$, $f_2$, $f_c$, $f_3$, and $f_4$. For example, a signal of a band having the center frequency of $f_c$ is a necessary signal of a desired band, and the other signals are unnecessary signals which operate as interference signals. For convenience of description, it is assumed that the gains of different multi-band signals are identical as 1.

At node B, the input RF signal is amplified to have a gain of $A_0$ by the low noise amplification unit 120, and the low noise amplification unit 120 may be implemented as a low noise amplifier (LNA). In the signal passing through the low noise amplification unit 120, noise components, such as thermal noise, which are received with the input RF signal may be reduced.

Figure 4D:
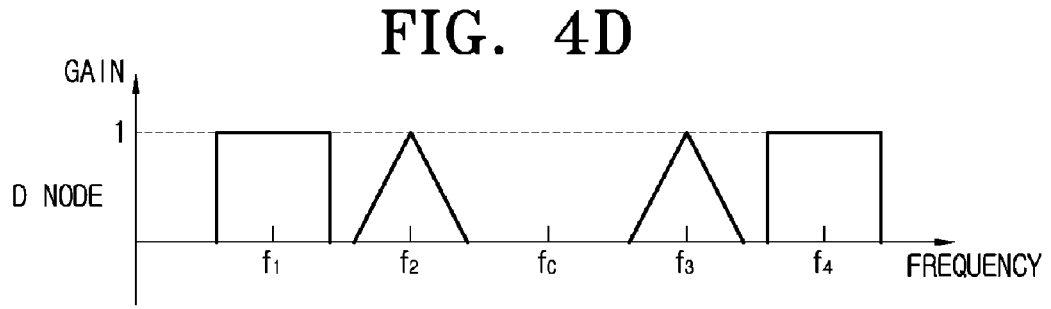
Figure 4E:
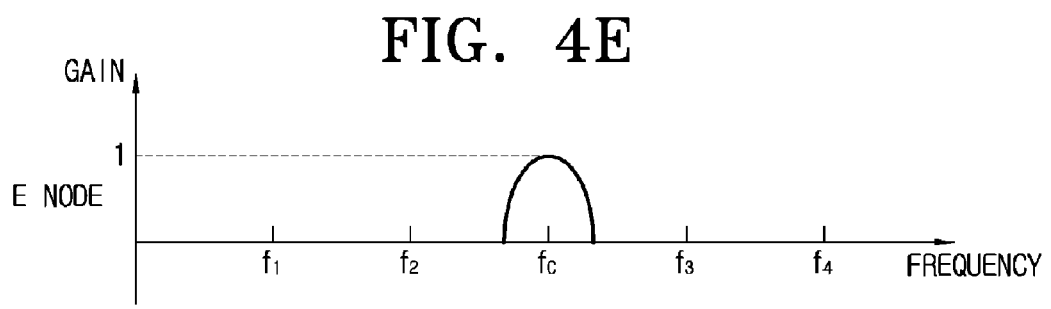

A necessary signal is removed from the signal processed by the low noise amplification unit 120 by a band reject filter 150 of the feedback processing unit 130. Since the bandwidth of signals transmitted from a transmitter (not shown) is known, a user may select a bandwidth to remove necessary signals using the band reject filter 150. At node D, the signal passing through the band reject filter 150 has only unnecessary signals as shown in FIG. 4D, since a necessary signal having the center frequency of $f_c$ has been removed.

The feedback processing unit 130 may further include an amplifier 160 in addition to the band reject filter 150. The amplifier 160 may be disposed in front of or behind the band reject filter 150. The amplifier 160 may be a low noise amplifier or a general amplifier having a function of lowering noise.

At node B, the signal processed by the low noise amplification unit 120 is fed back to the feedback processing unit 130, and passes through the amplifier 160. The band reject filter 150 removes the signal having the center frequency of $f_c$ from the amplified signal, so only unnecessary signals remain.

The signal processing unit 140 synthesizes the signal passing through the band reject filter 150 (D node) and the signal input through the antenna 110, so that the unnecessary signals are removed and the necessary signal remains (E node). According to an aspect, the synthesis indicates synthesis of the signal input through the antenna 110 and the signal output from the feedback processing unit 130 having a phase difference of substantially 180° from the input signal. According to another aspect, the signal from which the unnecessary signals, that is, interference signals, are removed, is input again to the low noise amplification unit 120, and is repeatedly fed back to the feedback processing unit 130 until the gain of the unnecessary signals becomes 0, that is, until the unnecessary signals are removed.

In order for the signal processing unit 140 to remove the unnecessary signals, the signal (D node) passing through the band reject filter 150 of the feedback processing unit 130 should have a phase difference of substantially 180° from the input RF signal. An element such as a subtractor which generates a phase difference of 180° may be used to obtain the signal remaining after the necessary signals have been removed (D signal) from the input RF signals (A node). Alternatively, an inverting amplifier may be used, or the gain of the amplifier 160 may be designed to have a negative value, so that a phase difference of 180° is achieved.

As shown in FIG. 3, the signal from which the necessary signal has been removed (D node) may be input to an output port (B node) of the low noise amplification unit 120. Where the signal processing unit 140 is located at the output port of the low noise amplification unit 120, the signal passing through the low noise amplification unit 120 and the signal from which the necessary signal has been removed may be synthesized. In this case, since the unnecessary signals are removed at the output port of the low noise amplification unit 120, linear characteristics are lower than where the unnecessary signals are removed at an input port of the low noise amplification unit 120 as shown in FIG. 3.

As described above with reference to FIGS. 3 and 4A to 4E, the interference signal removing apparatus 100 of the RF receiver 200 receives RF signals of only a desired band, so a plurality of SAW filters are not necessarily required for filtering outside the chip where multi-band RF signals are received. Accordingly, costs for manufacturing the interference signal removing apparatus of the RF receiver and the size of the interference signal removing apparatus may be reduced.

Figure 5:
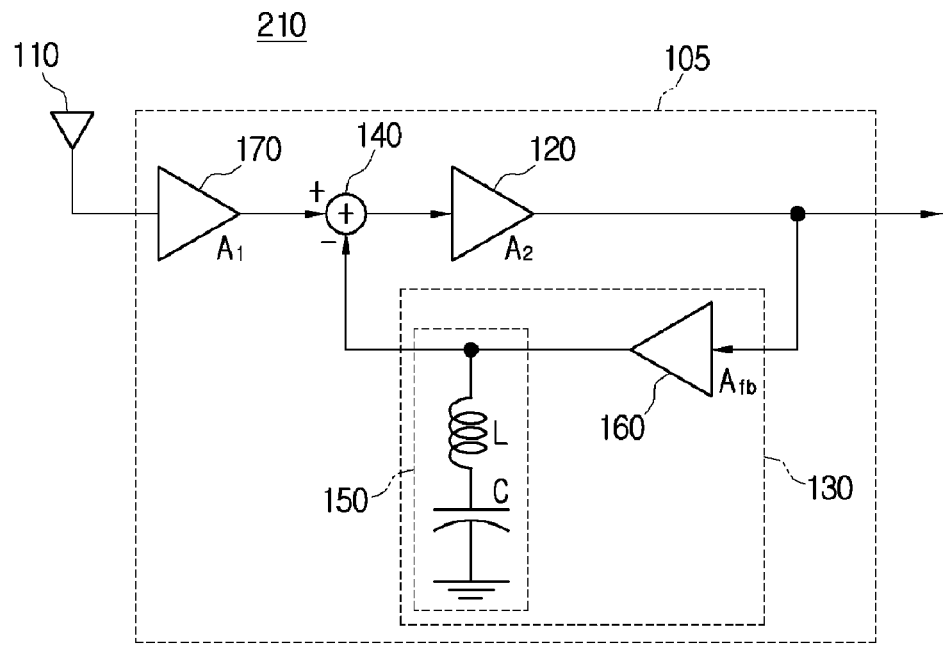
FIG. 5 is a diagram illustrating an exemplary interference signal removing apparatus of a RF receiver according to another exemplary embodiment

FIG. 5 illustrates an exemplary interference signal removing apparatus 105 of an RF receiver 210 according to another exemplary embodiment. The interference signal removing apparatus 105 of FIG. 5 further includes a low noise amplification unit 170 between the antenna 110 and the signal processing unit 140 in addition to the configuration of FIG. 3, and shows an example of the band reject filter 150.

As shown in FIG. 5, the interference signal removing apparatus 105 of the RF receiver 210 further includes the low noise amplification unit 170 which performs low noise amplification of an input RF signal. Accordingly, the signal processing unit 140 removes unnecessary signals by synthesizing the low-noise-amplified RF signal and a signal processed by the feedback processing unit 130. Since the low noise amplification unit 170 is formed between the antenna 110 and the signal processing unit 140, interference signals generated during the feedback process of the feedback processing unit 130 is removed. Accordingly, the interference signal removing apparatus 210 of the RF receiver 210 may have more enhanced noise preventing features.

Further shown in FIG. 5, the band reject filter 150 of the feedback processing unit 130 may be implemented as a circuit in which an inductor L is serially connected to a capacitor C. As shown in FIG. 5, one port of the inductor L of the serial LC circuit is connected to a node between the signal processing unit 140 and the amplifier 160, and one port of the capacitor C is grounded. Accordingly, the serial LC circuit operates as a band reject filter, so a necessary signal is removed by the earthed port and unnecessary signals are transmitted to the signal processing unit 140.

Figure 6:
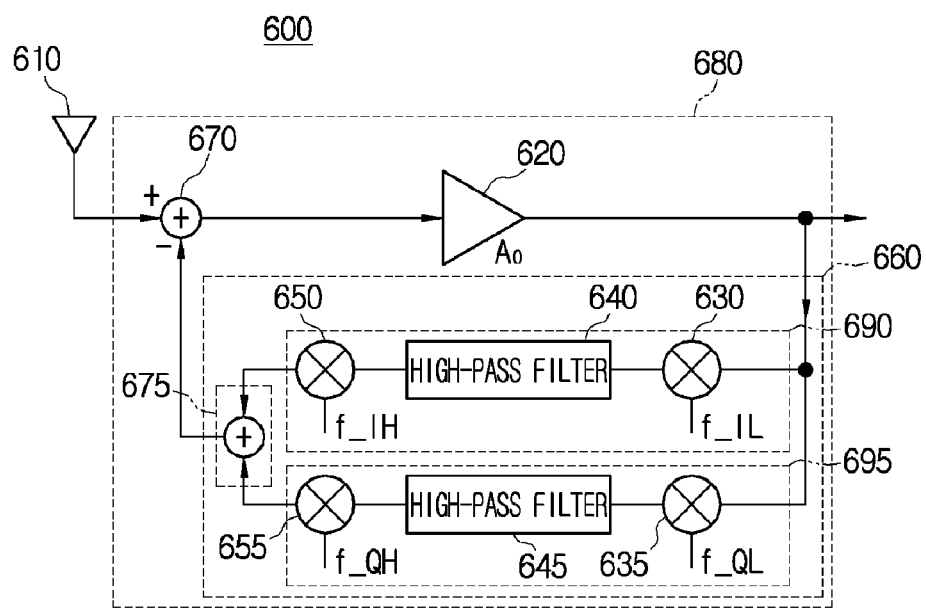
FIGS. 6 and 7 are diagrams illustrating exemplary interference signal removing apparatuses of RF receivers according to yet another exemplary embodiments.

FIG. 6 illustrates an exemplary interference signal removing apparatus 680 of an RF receiver 600 according to yet another exemplary embodiment. The interference signal removing apparatus 680 of the RF receiver 600 of FIG. 6 includes a low noise amplification unit 620 and a signal processing unit 670 which are the same as that of the interference signal removing apparatus 100 of the RF receiver 200 of FIG. 3. Accordingly, descriptions thereof are omitted herein.

A feedback processing unit 660 includes an in-phase signal processing unit 690, a quadrature signal processing unit 695, and a signal synthesis unit 675. The in-phase signal processing unit 690 removes a necessary signal from an in-phase signal of a low-noise-amplified signal. The quadrature signal processing unit 695 removes a necessary signal from a quadrature signal of the low-noise-amplified signal. The signal synthesis unit 675 synthesizes the signals processed by the in-phase signal processing unit 690 and the quadrature signal processing unit 695, and outputs the synthesized signal to the signal processing unit 670.

The in-phase signal processing unit 690 and the quadrature signal processing unit 695 may each include down-mixing units 630 and 635, high-pass filters 640 and 645, and up-mixing units 650 and 655. The down-mixing unit 630 or 635 lowers the frequency of the low-noise-amplified signal to a baseband. The high-pass filter 640 or 645 filters out necessary signals from among the signal adjusted to the baseband. The up-mixing unit 650 or 655 raises the frequency of the filtered signal to the RF band.

Hereinafter, the operation of the feedback processing unit 660 which removes a necessary signal using a single sideband modulation manner generally used in a communication field is described.

The down-mixing units 630 and 635 each multiply a signal passing through the low noise amplification unit 620 by local frequencies $f_{IL}$ and $f_{QL}$ of an in-phase component and a quadrature component, respectively, so that the frequency band of the signal is transited to a baseband. A phase difference of substantially 90° is generated between the in-phase component and the quadrature component similarly to the sine and cosine functions.

In the baseband, the high-pass filters 640 and 645 perform high-pass filtering of the signals, so that necessary signals are removed. The high-pass filters may be implemented as capacitors, first and second filters, or the like.

The up-mixing units 650 and 655 each multiply the signal from which the necessary signal has been removed by local frequencies $f_{IH}$ and $f_{QH}$, respectively, so that the frequency band of the signal is transited to the RF band.

The signals output from the in-phase signal processing unit 690 and the quadrature signal processing unit 695 are synthesized by the signal synthesis unit 675, and transmitted to the signal processing unit 670. The description of the signal processing unit 670 is omitted here to avoid repetition.

The frequency in the down-mixing units 630 and 635 may be the same as that in the up-mixing units 650 and 655 so as to perform filtering without errors. According to an aspect, high-pass filtering is performed in the baseband instead of in the RF band so that more precise removal of the necessary signal may be implemented.

Figure 7:
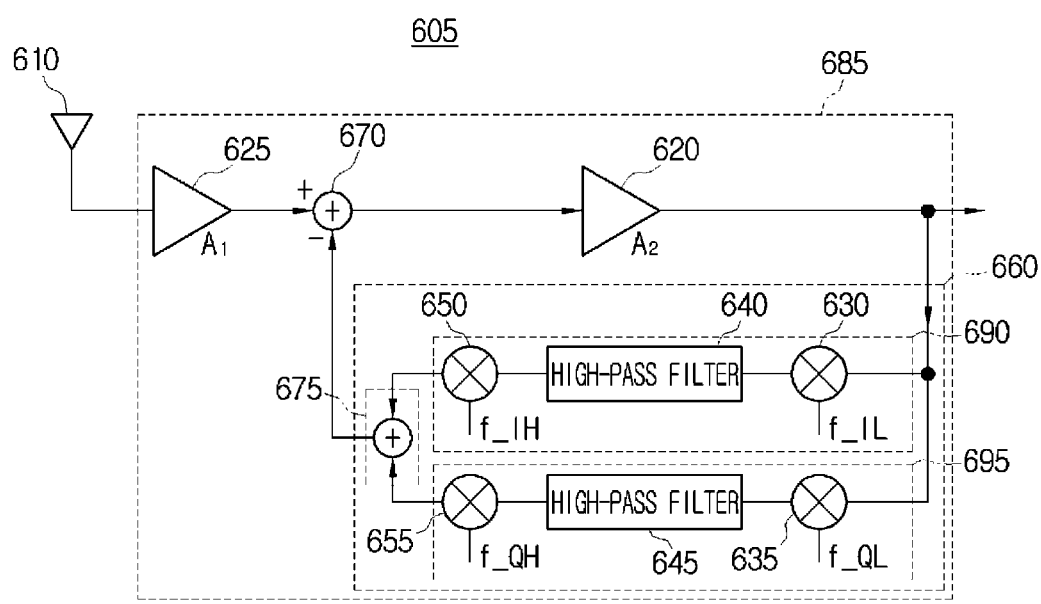

FIG. 7 illustrates an exemplary interference signal removing apparatus 685 of an RF receiver 605 according to yet another exemplary embodiment. The RF receiver 605 of FIG. 7 further includes a second low noise amplification unit 625 which is formed at an input port of the RF receiver 600, that is, between the antenna 610 and the signal processing unit 670. The second low noise amplification unit 625 may be the same as that of the interference signal removing apparatus 105 of the RF receiver 210 of FIG. 5. Accordingly, detailed description of the second low noise amplification unit 625 is omitted here to avoid repetition. Moreover, the interference signal removing apparatus 685 includes the low noise amplification unit 620, the signal processing unit 670, and the feedback processing unit 660 which are the same as that of the interference signal removing apparatus 680 of the RF receiver 600 of FIG. 6. Accordingly, descriptions thereof are omitted herein.

It is understood that the terminology used herein, for example, a low noise amplification unit, may be different in other applications or when described by another one skilled in the art. As an illustration, a low noise amplification unit disclosed herein may be described or taught as a noise amplification unit which performs low noise amplification.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An interference signal removing apparatus comprising:
a low noise amplification unit which performs low noise amplification;
a feedback processing unit which removes a necessary signal in a desired band from a signal output from the low noise amplification unit, and performs feedback of the signal from which the necessary signal is removed; and
a signal processing unit which transmits a processed radio frequency (RF) signal by synthesizing an input RF signal and the feedback signal to the noise amplification unit,
wherein the signal processing unit comprises a synthesizer for synthesizing the input RF signal and the feedback signal, and
the necessary signal in the desired band and the processed input radio frequency (RF) signal have the same band.

2. The apparatus of claim 1, wherein the feedback processing unit comprises a band reject filter.

3. The apparatus of claim 2, wherein the feedback processing unit further comprises an amplifier which amplifies the signal processed by the low noise amplification unit, and transmits the amplified signal to the band reject filter.

4. An interference signal removing apparatus comprising:
a low noise amplification unit configured to perform low noise amplification;

a feedback processing unit comprising a band reject filter configured to remove a non-interference signal in a desired band from a signal output from the low noise amplification unit, and the feedback processing unit is configured to perform feedback of the non-interference signal from which the signal in the desired band is removed; and a signal processing unit configured to transmit a processed radio frequency (RF) signal by synthesizing an input RF signal and the feedback signal to the noise amplification unit, wherein the feedback processing unit further comprises:

an in-phase signal processing unit configured to remove the non-interference signal from an in-phase signal of the low-noise-amplified signal;

a quadrature signal processing unit configured to remove the non-interference signal from a quadrature signal of the low-noise-amplified signal; and a signal mixing unit configured to mix the signals processed by the in-phase signal processing unit and the quadrature signal processing unit, and transmits the mixed signal to the signal processing unit.

5. The apparatus of claim 4, wherein the in-phase signal processing unit and the quadrature signal processing unit each comprise:

a down-mixing unit configured to lower a frequency of the low-noise-amplified signal to a baseband;

a high-pass filter configured to filter out the non-interference signal from the signal adjusted to the baseband; and an up-mixing unit configured to raise a frequency of the high-pass-filtered signal to an RF band.

6. The apparatus of claim 5, wherein a local frequency used in the down-mixing unit is the same as that used in the up-mixing unit.

7. The apparatus of claim 1, further comprising a second low noise amplification unit which is connected to an input port of the interference signal removing apparatus.

8. The apparatus of claim 1, wherein the signal processing unit transmits the processed RF signal from which interference signals are removed by synthesizing the input RF signal and the feedback signal to the noise amplification unit.

9. The apparatus of claim 1, wherein the low noise amplification unit, the feedback processing unit, and the signal processing unit are integrated into a single chip.

* * * * *